July 16, 1968  R. H. ENGELMANN  3,393,344
PHOTOSENSITIVE VANE ACTUATED CIRCUITRY FOR DIMMING HEADLAMPS
Filed Oct. 7, 1966  6 Sheets-Sheet 1

PRIOR ART

Fig 3

INVENTOR.
RICHARD H. ENGELMANN
BY Charles M. Hogan

ATTORNEY

July 16, 1968 R. H. ENGELMANN 3,393,344
PHOTOSENSITIVE VANE ACTUATED CIRCUITRY FOR DIMMING HEADLAMPS
Filed Oct. 7, 1966 6 Sheets-Sheet 2

INVENTOR.
RICHARD H. ENGELMANN
BY Charles M. Hogan
ATTORNEY

INVENTOR.
RICHARD H. ENGELMANN
BY
Charles M. Hogan
ATTORNEY

July 16, 1968   R. H. ENGELMANN   3,393,344
PHOTOSENSITIVE VANE ACTUATED CIRCUITRY FOR DIMMING HEADLAMPS
Filed Oct. 7, 1966                                  6 Sheets-Sheet 4

INVENTOR.
RICHARD H. ENGELMANN
BY *Charles M. Hogan*

ATTORNEY

Fig 12

# United States Patent Office 3,393,344
Patented July 16, 1968

3,393,344
PHOTOSENSITIVE VANE ACTUATED CIRCUITRY
FOR DIMMING HEADLAMPS
Richard H. Engelmann, Cincinnati, Ohio, assignor to
J. Page Hayden, Cincinnati, Ohio
Filed Oct. 7, 1966, Ser. No. 589,775
22 Claims. (Cl. 315—82)

The present invention relates to automatic tracking control for headlamp systems and specifically to improved electronic circuitry for driving the vanes in a headlamp system which is basically described in U.S. Patents 2,562,-258 and 2,753,487, issued to Evan P. Bone by the U.S. Patent Office and assigned to J. Page Hayden of Cincinnati, Ohio. The basic system is referred to as a Bone headlight control system. The current state of the art with respect to improvements in the Bone type system is fairly represented by U.S. Patent 2,941,118 issued to R. H. Engelmann on June 14, 1960.

The Bone headlight control system is an electrical and optical installation in an automobile (i.e., equipped vehicle) which so functions that a non-glare shadow automatically is cast on the zone of an oncoming vehicle, as the passing approach is made, in order to protect its operator from disability and discomfort glare. The Bone system functions in such a way that the shadow tracks the approaching vehicle while light of such intensity as to effect greatly improved night visibility for the driver of the equipped vehicle is projected onto the right side of the road in front of the equipped vehicle throughout the approach. As the approaching vehicles finish passing each other the light is projected down the road centrally.

The Bone system is premised generally on a direction finder including photoelectric means for detecting the presence of an oncoming vehicle, in combination with a direction-finder vane which is positioned in azimuth, under the ultimate control of the photoelectric means, to measure the direction of approach of the oncoming vehicle (specifically, the relative bearing of the left or inner headlamp of the approaching vehicle, "inner" meaning closer to the center line of the highway). Synchronized with the direction-finder vane are vanes in specially constructed head lamps which function in such a way as to define the projection of light and to cause overlapping shadows or non-glare areas to track the approaching vehicle until it passes or comes alongside the equipped car, all as described in detail in the aforementioned Bone patents.

Improved systems of this character are described in the following additional U.S. patents, assigned to the same assignee as the present application and invention, and reference is made to such patents for a detailed description of such improvements, both as to structure and mode of operation: Engelmann 2,917,663 issued Dec. 15, 1959, Engelmann and Foster 2,917,666 issued Dec. 15, 1959, Englemann 2,941,118 issued June 14, 1960, Dugle 2,941,117 issued June 14, 1960.

Figure 3:
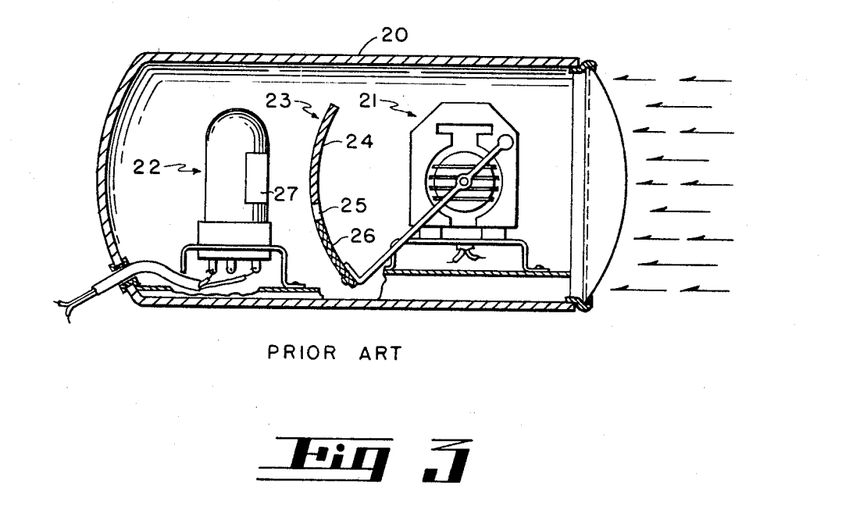
FIG. 3 is a horizontal sectional view through a Bone-type direction finder unit showing a photoelectric tube, a galvanometer and an associated arcuate shutter in the position assumed when no oncoming vehicle is present.
Figure 4:
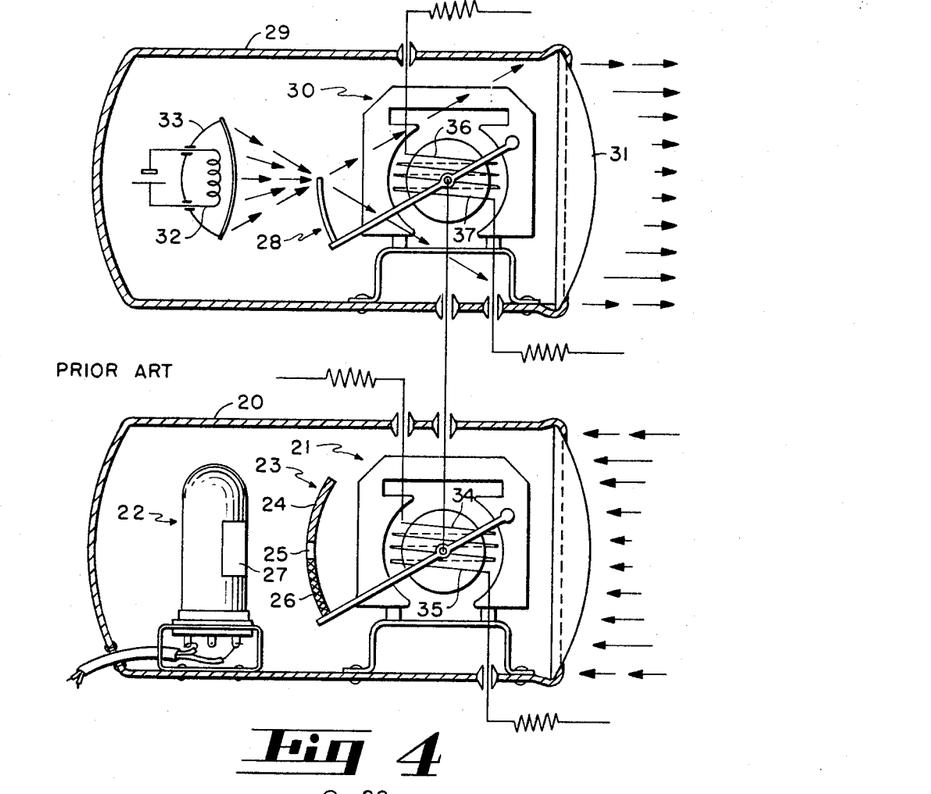
FIG. 4 is a simplified schematic top plan view of a direction finder and headlight appropriately synchronized with the direction finder.

Referring briefly to FIG. 3, before discussing the objects of the invention, there is shown a Bone-type direction finder comprising a casing 20, galvanometer movement, phototube 22, and arcuate shutter 23, positioned in azimuth by the galvanometer 21. The angular operating position of the shutter is indicative of the relative bearing of the oncoming vehicle. The shutter is formed with a graduated filter or semi-transparent area 24, a clear area 25, and an opaque area 26. The entire system is so arranged that when power is applied and the equipped car moves down the road at night with no approaching vehicle in range, the filter 24 covers the phototube light-admitting aperture 27. The direction finder vane is then in the quiescent or retracted position (counterclockwise), and the headlamp vanes are so positioned (counterclockwise) that the full illumination of the headlamps is cast down the road. In this position of the direction finder vane, the filter strongly attenuates light coming toward the equipped car from regions to the right of the center line of the direction finder's field of view, and less strongly attenuates light from regions to the left of such center line. When an oncoming car enters into such field of view, and light from its inner headlamp reaches a predetermined value, the phototube signal output causes the vane to swing clockwise. The image of the oncoming car's headlamp is, as the vane swings clockwise, in progressively less dense portions of filter 24, causing increasing phototube output and increasing the swing on the vane until such a position is reached that clear area 25 registers with aperture 27. The attainment of this position by the vane permits full light from the oncoming headlamp to pass to the phototube. In other words, this is the "pickup position." As explained in the aforementioned Bone patents, the operation of the system is such that, once light from an oncoming approaching vehicle is picked up, the leading edge of opaque area 26 is automatically positioned in such a way as to track or measure the relative bearing of such vehicle and to control events which cause the headlamps of the equipped vehicle to properly angularly position the non-glare shadows they cast. The synchronism between the direction finder vane and the vanes in the headlamps is described in U.S. Patent 2,753,487 to Bone. Referring to FIG. 7 of that patent and FIG. 4 of the present patent application (reference numerals in FIG. 4) the angular position of direction finder vane portion 26 is synchronized with that of headlamp vane 28 (left headlamp shown) in such a way that headlamp vane 28 causes a non-glare shadow to be cast on an oncoming car. In FIG. 4 there are shown the direction finder and the left headlamp, comprising a casing 29, vane 28, vane-positioning galvanometer 30, lens 31, light-emitting filament 32, and reflector 33, all generally as described in Bone Patent 2,753,487. The galvanometer coils, 34 and 35 for the direction finder and 36 and 37 for the headlamp and associated connections, are also shown.

The principal object of the present invention is to provide driving circuitry for the vane or vanes of a Bone headlamp system which is greatly simplified, relatively insensitive to noise, and which possesses the following advantages with respect to prior art control circuitry:

(1) Synchronization of headlamp vanes with direction finder vane without reliance on springs, subsidiary feedback loops, or similar devices.

(2) Provision for driving the vanes to the "closed" position in the absence of chopping action from the discriminator.

(3) The ability to preset vane actuator speed so as to optimize the speed of response, overshoot, and frequency of hunting, if such should occur.

(4) The ability to adjust vane actuator speed during operation so as to insure high speeds of vane motion during the acquisition phase of the operation of tracking (especially if headlamps suddenly appear in the field, as occurs when a car comes over the top of a hill, together with reduced speeds of vane motion during the actual tracking phase, so as to achieve the advantages set forth under (3) above).

(5) A simplified "search-flash" operation.

The "closed" position is that for "search" (clockwise).

Another object of the invention is to provide a vane driving system which is, broadly speaking, a relay system and not a repeater system.

A further fundamental object of the invention is to provide vane driving circuitry which is digital in character and controlled by a binary decision device.

For a better understanding of the invention, together with other and further objects, advantages and capabilities thereof, reference is made to the following description of the appended drawings, in which:

FIG. 13 is a preferred form of motor drive circuitry in accordance with the invention.

Figure 1:
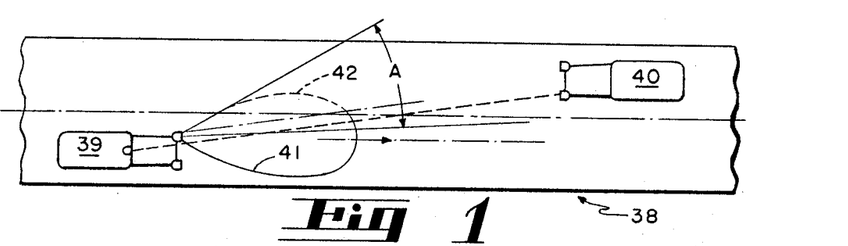
FIG. 1 is a top plan view of a vehicle incorporating a headlamp system in accordance with the invention in relation to an oncoming vehicle, illustrating the conditions which prevail when the vanes of the improved vehicle are in position to cast a shadow on that portion of the road on which the oncoming vehicle is located.

In FIG. 1 there is illustrated a roadway, generally designated 38, and an improved vehicle 39 traveling towards the right on the roadway and approaching an oncoming car 40. The light emanating from the left headlight of the improved vehicle normally is concentrated largely within the area bounded by the curved full and dash lines 41–42. When the oncoming vehicle has approached to the position illustrated in FIG. 1, the shutter mechanisms within the headlights operate to cast a shadow within angle A, thereby blocking that part of the headlight beam falling within the area defined by that angle, a resulting shadow being cast across the roadway to that area occupied by oncoming vehicle 40.

Figure 2:
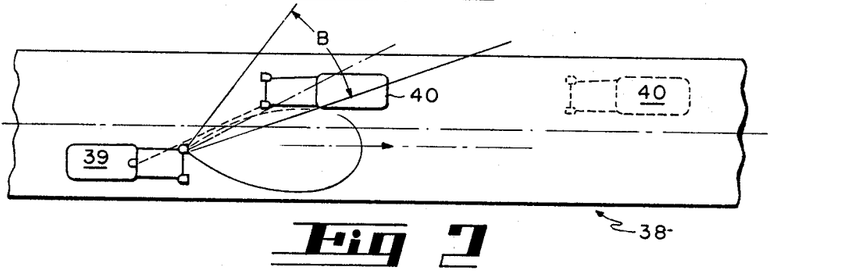
FIG. 2 is a view similar to FIG. 1 but with the vehicles in closer proximity, the shadow from the improved vehicle still being cast upon that portion of the road occupied by the oncoming vehicle.

With reference to FIG. 2, the vehicles are illustrated in closer proximity. The shadow is now cast through angle B, again in a position to cut off that portion of the improved vehicle's headlight beam which would impair the visibility of the oncoming vehicle driver.

The shift of position of the shadows is accomplished by the action of the direction finder (FIG. 3) which senses the presence of an oncoming vehicle and its relative bearing with respect to own vehicle and which tracks such oncoming vehicle and causes the shutters or vanes in the headlamps to be synchronized with the vane in the direction finder.

Parenthetically, it may be in order to explain at this point the significance of the terms "search" and "flash." It is a matter of public notice that oncoming automobile operators frequently do not dim down their headlights. It is common practice for the victim of such circumstances to switch from down beam to up beam for an instant and then back to down beam in order to remind the offending driver of requisite courtesy and law. Now while the present invention and all Bone-type systems are "homing" or continuously operating devices in their normal operation, so that the offending driver would normally be protected by the non-glare shadow, normal operation can be overridden by turning the headlamp vanes counterclockwise, thus removing the nonglare shadow instantaneously from the offending vehicle. This "flashing" action corresponds to flashing an offending oncoming driver with bright beams in conventional headlighting systems.

Now Bone-type systems, as to which the present invention is an improvement, are designed automatically to respond at considerable range to the bright lights of an oncoming car. Oncoming cars with down beams will approach much more closely to a car equipped with the Bone-type of system than will oncoming cars with up or bright beams.

It is possible to cause the Bone-type system to respond to down beams of an oncoming car at increased range by overriding the normal automatic operation of the Bone system in such a manner as to turn the headlamp vanes clockwise. This is called a "search" operation and it causes the photoelectric system of Bone headlamps to begin to respond to down beams of oncoming headlamps at a range greater than the automatic response would be effective in.

"Flash" and "search" are fully described in the aforementioned Engelmann-Foster patent.

Figure 6:
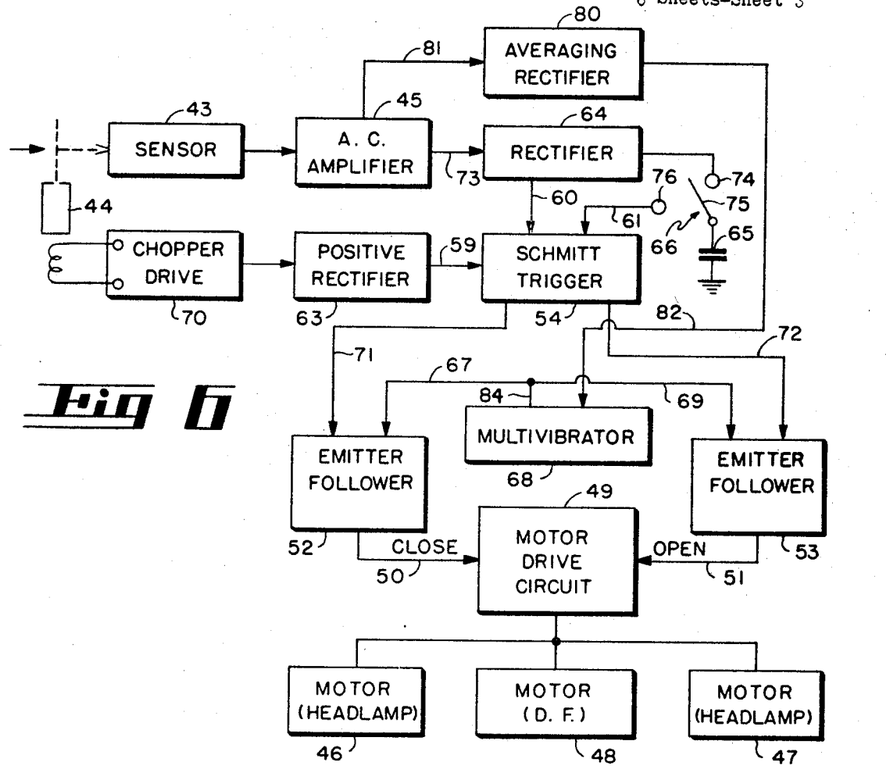
FIG. 6 is a schematic diagram, generally in block form, of an improved headlight control system in accordance with the invention.

Referring now specifically to FIG. 6, there is shown motor drive circuitry in accordance with the invention. In lieu of the prior art direction finder drive galvanometer of FIG. 3 and the prior art headlamp vane galvanometer of FIG. 4, the preferred embodiment of the combination in accordance with the present invention utilizes stepper motors as an improvement over galvanometers. The sensor 43 of FIG. 6 is associated with the direction finder and it utilizes a solar cell and optics and a light chopper in accordance with United States patent to Engelmann No. 3,132,252, issued May 5, 1964, to which reference is made for a detailed description. Suffice it to say that light from an oncoming car passes through the chopper 44 and is thereby processed in such manner that the sensing device responds to an oncoming point source of light such as an automobile headlight, but does not respond to spurious influences such as bill boards, etc., all as explained in the aforementioned Engelmann patent.

The sensor 43 generates an electrical signal at its output when a point source of light, such as an oncoming car, sends rays through the discriminator chopper 44. When the installation in accordance with the invention is "turned on" or supplied with power the chopper 44 is driven by a chopper drive 70, a form of which is shown in the above-mentioned Engelmann Patent No. 3,132,252 (see elements 95, 96, 99 and 100 of FIGS. 1–3 of the Engelmann Patent 3,132,252, these constituting an electromagnetic oscillator). In the event that the power is turned off or that the chopper drive is inoperative for any reason, then the vanes of the headlamps are driven to their "closed" or "search" position and they remain there, as will be described later in this specification.

The light as chopped by chopper 44 causes the sensor 43 to produce a series of pulses and the resulting signal is amplified by an alternating current amplifier 45 having an input coupled to the output of the sensor.

The signal output of the sensor 43 is used to control a motor 48 (FIG. 6) which drives the direction finder vane and motors 46 and 47 which drive the headlamp vanes in synchronism with the direction finder vane. The elements 46, 47 and 48 are stepper motors and they are provided, in accordance with the invention, in lieu of the galvanometer-type motors previously used in Bone-type systems. The pulses for driving these motors are produced by a multivibrator 68 and the pulse output of the multivibrator is gated to a motor drive circuit 49 in such manner that when the gating is to one of the inputs of the motor drive circuit the motors are driven in one direction, and when the gating is to the other input of the motor drive circuit then the motors are driven in the opposite direction.

Accordingly, there are interposed between the output of the multivibrator 68 and the motor drive circuit 49 gates in the form of emitter followers 52 and 53. When the emitter follower gate 52 is enabled it gates into the input 50 of motor drive circuit 49, from multivibrator 68, pulses which drive the motors to the "close" or "search" position. When the emitter follower gate 53 is enabled it gates, from the multivibrator 68 into the input 51 of the motor drive circuit 49, pulses which drive the motors to the "open" or "flash" direction. The selection of gates is made by a decision device or Schmitt trigger circuit 54, a binary device which is characterized by two states in one of which it applies an enabling pulse over its output line 71 to enable gate 52, in the other of which it applies a pulse over its output 72 to enable gate 53.

It will be seen from the foregoing that the Schmitt trigger circuit 54 is a decision circuit or binary device which decides in which direction to drive the motors in the direction finder and the headlamps.

For a complete description of a Schmitt trigger device, which is per se conventional, reference is made to Section 10–11, pp. 389–394, of the textbook entitled "Pulse, Digital, and Switching Waveforms" by Millman and Taub, McGraw-Hill, Inc., New York, 1965.

Figure 7:
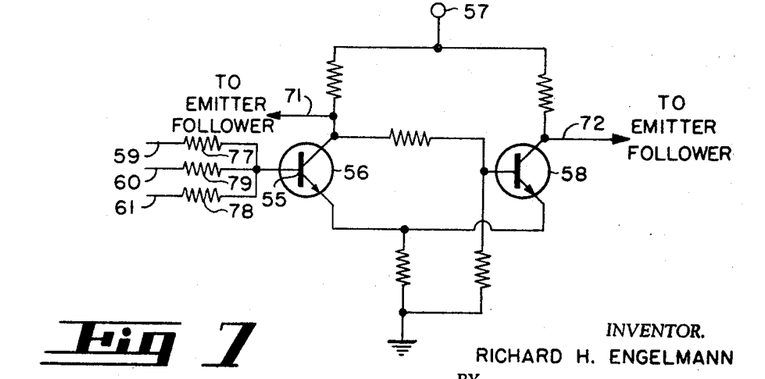
FIG. 7 is a detailed showing of the Schmitt trigger circuitry incorporated in the FIG. 6 system.

The Schmitt trigger device is shown in detail in FIG. 7. It comprises a pair of transistors 56 and 58 arranged in an emitter-coupled fashion, with an output 71 at the collector of the transistor 56 and an output 72 at the collector of transistor 58. It will be understood that the terminal 57 is connected to the positive terminal of a suitable source of biasing currents, as is conventional. The Schmitt trigger circuit assumes a condition in which transistor 56 is conductive and gate 53 is open, and the motors are driven in the "open" direction.

The other condition of the Schmitt trigger circuit is one in which transistor 58 is conductive and gate 52 is open and the motors are driven in the "close" direction.

When the input to base 55 is zero transistor 56 is in the cut-off condition and its collector voltage is substantially at the level of the supply voltage of terminal 57. Transistor 58 is conducting and its collector voltage is quite low. As the level of the input voltage on base 55 is increased a point is reached at which transistor 56 suddenly goes into heavy conduction and transistor 58 is cut off. When transistor 58 is cut off then its collector voltage is very nearly at the voltage of terminal 57. As input voltage at base 55 is reduced the converse action occurs and the circuit reverts to its original state at which transistor 56 is not conducting. There is a difference in the levels at which these two actions occur, a higher input voltage being required to put transistor 56 into full conduction (with attendant cut-off of transistor 58) than the voltage at which transistor 56 is again cut-off and transistor 58 goes into full conduction. This "hysteresis" can be reduced by suitable design of the circuit. Other configurations of the trigger circuit are known and can be used in practicing this invention.

The two states of the Schmitt trigger will be identified as follows: a first state in which 56 is not conducting so that the drive is "closed"; a second state in which 56 is conducting so that the drive is "open."

This discussion of the Schmitt trigger and following circuits may be summarized as follows: If the voltage on base 55 is below the switching level, the motors drive the vanes toward the "closed" position; if the voltage on base 55 is above the switching level, the motors drive the vanes toward the "open" position.

If for any reason the chopper drive 70 is not operating then there will be no voltage on line 59 (FIGS. 6 and 7) and therefore the input 59 to the Schmitt trigger will not cause transistor 56 to become conductive. In the absence of any chopping action there will be no pulse inputs to the A.C. amplifier 45 and therefore no substantial voltage on line 73. Even if light sources are, under that circumstance, in the field of the sensor, any voltage on line 73 will be rectified by rectifier 64 to produce a negative voltage on line 60 and, since input 60 to transistor 56 will then be negative transistor 56 will remain nonconductive. These facts assure that the vanes will remain in the "closed" position. The discussion now assumes that an oncoming car approaches and that the chopper drive is in operation so that pulsed outputs are produced by amplifier 45.

As chopper action begins an alternating electrical output from the chopper drive 70 will be rectified by positive rectifier 63, producing a positive voltage on line 59 and therefore at base 55. When this voltage passes the switching level, the output 72 of the decision device 54 then takes over the control of the emitter follower gate 53 so as to cause the motors to drive toward the "open" position. Prior to the attainment of said switching level the Schmitt trigger is in its condition which causes the motors to drive toward the "close" condition. Now, as has been said, the voltage does not pass the above-mentioned switching level until the chopper drive is actuated and the system is set up to chop incoming light from point sources of light. This fact is a significant safety feature because it prevents the system from operating in a mode which is potentially dangerous, i.e., the "flash" mode. Therefore an important objective of the invention has been achieved in that the vanes are always driven to the "closed" or "search" position in the absence of chopping action. The time constant of the positive rectifier circuit 64 is preferably such that all vanes are in the "close" position and against stops (not shown) and are in synchronism before the drive toward the "open" position is initiated.

It will now be noted that the presence of a small light source in the field will cause chopped light to reach sensor 43 and the resulting signal will be amplified in A.C. amplifier 45 and will cause a negative signal on line 60. If this signal is sufficiently large, it will drive the voltage on base 55 below the switching level, and the motors will drive the vanes toward the "closed" position. When the direction finder vane intercepts the incoming light, voltage on base 55 will rise above the switching level and cause the vanes to move toward the "open" position. Readmission of light to sensor 43 will cause motion of the vanes toward the "closed" position. Thus a hunting action of small amplitude occurs.

Depending upon the state of Schmitt trigger 54, collector supply voltage will be applied to either emitter follower 52 or to emitter follower 53. Therefore the output of multivibrator 68 will be passed either to line 50 through emitter follower 52, or to line 51 through emitter follower 53. The presence of pulses on line 50 will energize motor drive circuit 49 in such a way as to drive the direction finder vane actuating stepper motor 48 and headlamp vane actuating stepper motors 46 and 47 so as to shut off incoming light in the direction finder, and so as to introduce vanes into the headlamp beams. This position is the "closed" position. Presence of pulses from multivibrator 68 on line 69 will cause motor drive circuit 49 to be energized so as to drive all vanes in the opposite direction; that is, so as to remove the vanes from the headlamp beams and so as to remove the vane in the direction finder from the light path. This is the "open" position.

The relationships among the chopper drive 70, positive rectifier 63, the line 59, the Schmitt trigger 54, the line 71, emitter follower 52, sensor 43 and amplifier 45, are such that the system "fails safe" when the chopper drive is not working or in the absence of a chopped pulse output on line 73. On the other hand, when the system is in normal operation the chopper drive 70 and the positive rectifier 63 and line 59 have a tendency to bring base 55 above the threshold of conductivity of transistor 56 and this tendency has some broad points of analogy to a spring tending to cause the vanes to be driven to the open position. The signal which is processed by the sensor 43 and the amplifier 45 and the rectifier 64, as applied to the Schmitt trigger device 54 by line 60, tends to drive the base of transistor 56 below the threshold of conductivity and therefore is analogous in a broad sense to a mechanical spring which drives the vanes toward the close position. In other words, when the chopper drive is in operation it will cause the vanes to be driven to the open position in the absence of signal appearing in line 60 which tends to drive the vanes toward the close position.

Parenthetically, it is noted that rectifier 64 is a network having a negative output to line 60 and a positive output to contact 74.

Attention is now directed to the input 61 to the Schmitt trigger device and to the single-pole double-throw switch 66 which has two fixed contacts 74 and 76, 74 being at the output of rectifier 64 and 76 being connected to line 61, the moving contact 75 being normally in circuit with a capacitor 65 which has a grounded terminal. The elements 66 and 65 constitute a manually operable override for purposes of "search" and "flash." Normally this switch is closed on contact 74, by spring loading (not shown). When a very weak source of light is in the field of the sensor and is insufficient to actually sustain tracking the search operation is initiated in the manner now discussed. Under these circumstances the voltage output of the positive rectifier of unit 64 at contact 74 is low. Switch 66 is thrown to connect contacts 75 and 76, the low voltage existing on capacitor 65 being applied to input 61 of the Schmitt trigger. The resistors 77, 78 and 79 at inputs 59, 61 and 60, respectively, are so proportioned that the application of this low voltage will cause the voltage at base 55 to fall below the threshold of conductivity of transistor 56, which becomes nonconductive and causes the vanes to be driven to the "closed" position for search. When a graded density filter is used for element 24 (FIG. 3) this action causes the oncoming headlight to appear in successively less dense portions of the filter (as explained in U.S. Patent 2,917,666 to Engelmann and Foster) so that the system may more easily pick up that headlamp and track on it, the increase in signal causing the negative output on line 60 of rectifier 64 to go more negative and maintain the motor drive toward the "closed" position until normal tracking begins. In case the source disappears, proper portioning of resistors 77, 78 and 79 in conjunction with the value of capacitor 65 will cause the system to drive the vanes to approximately mid-position before capacitor 65 charges sufficiently from the positive voltage on line 59 via resistors 77 and 78 to allow the voltage on base 55 to rise above the switching level, driving the vanes toward the "open" position again. Release of switch 66 returns capacitor 65 to contact 74.

Assume now that an oncoming car is approaching with undimmed headlamps, the control system having "acquired" the oncoming car. As a reminder, the headlamps of own car are to be "flashed." Since the system is tracking, positive voltage will be present at contact 74. By the use of long time constants in the positive section of rectifier 64, this voltage can be equal to the peak signal and held throughout the hunting cycle. If switch 66 is now operated, capacitor 65 (with a positive potential) is connected to line 61, and will hold the potential of base 55 above the switching level for a brief instant, driving the vanes toward the "open" position and "flashing" the oncoming driver. Again, release of switch 66 will reconnect capacitor 65 to contact 74.

At this point several advantages of the improved system are apparent.

First, synchronization of all three vanes is achieved by driving all three vanes against stops (not shown) at the beginning of operation of the system and also at frequent intervals during operation. When the system is first energized and until the output of the time constant circuit in rectifier 63 exceeds the threshold voltage on base 55 all vanes are driven into the "closed" search position. Hence all three are brought up against fixed stops adjusted so that the vane positions are brought into register. When the signal to motor drive circuit 49 is switched by trigger 54 from line 50 to line 51, all three motors will be driven in synchronization to the open position. At this position again, stops (not shown) are incorporated and so adjusted that all three vanes are in register. All three vanes must start from identical positions and must track in synchronism. If for any reason, such as momentary loss of supply voltage, synchronization is lost, it will be regained as soon as all three vanes are driven again against the "open" stops.

Second, in previous tracking systems it has been possible to have no chopping action, either due to loss of supply for the chopper drive circuit or to failure in starting of the electromechanical oscillator or of a drive motor in those systems which used a motor-driven chopper. This would result in fully "open" headlamp vanes with no possibility of driving them toward the "closed" position when opposing headlamps appeared in the field. The invention eliminates this.

Third, in previous control circuits any signal appearing in the amplifier is used to drive the vanes. In addition to the desired signals, electrical noise and pickup from the ignition system have frequently appeared on the signal path in the amplifier, resulting in jittery action of the vanes and hence of the shadow in the field of view. The present invention eliminates this effect.

It has been pointed out that positive rectifier 63 is inserted between the chopper drive 70 and the trigger 54 in order to provide the "fail safe" operation and the drive-toward-open-position effect for normal operation.

The negative-output portion of rectifier 64 is in circuit between output 73 of amplifier 45 and trigger 54 in order to provide the drive-toward-closed-position effect for normal operation. As indicated above, rectifier network 64 also has a positive output at 74.

The purpose of the averaging rectifier 80, in circuit between output 81 of the amplifier 45 and input 82 of multivibrator 68, is to control the time between output pulses of the multivibrator 68, as will be explained below.

Speed of motors 46, 47 and 48 is determined by the frequency of multivibrator 68, one step of advance being made for each output pulse. In general, in a feedback control system of the "switched" or relay type such as that being considered, the higher the speed of the actuator, the greater the overshoot and the greater the probability of large amplitude hunting around the desired point. In systems using spring-centered galvanometers or similar devices, the control system speed is determined largely by the supply voltage required to drive the galvanometer to its full excursion against the restraining torque of a spring. The spring being the necessary element to provide synchronization, speed could be reduced only by weakening the spring. This in turn resulted in less accuracy of synchronization, frictional effects and inertia torques, which introduced more important sources of error.

Speed is adjusted in the improved system in accordance with the invention by changing the multivibrator 68 frequency to obtain the optimum characteristics with regard to speed of response, overshoot, and hunting action.

Adjustment as indicated above frequently results in low speeds in order to give a small hunting amplitude. Such low speeds are a disadvantage if light sources suddenly appear in the field, as will occur when an oncoming car suddenly appears over the crest of a hill or around a sharp bend. In order to provide high speed slewing operation during the acquisition phase for such cases, full advantage is taken of the ability of the motors 46–48 to follow increased pulse rates, such an increased rate being provided during the acquisition phase.

Figure 5:
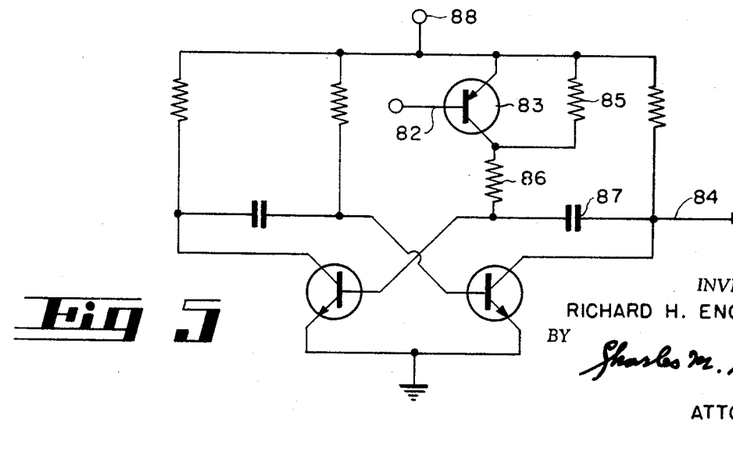
FIG. 5 is a detailed showing of the bias-controlled multivibrator incorporated in the FIG. 6 system.

Multivibrator 68 is shown in detail in FIG. 5. Operation of such circuits is well understood by those skilled in the art, and will not be repeated here. The circuit of FIG. 5, save for the introduction of transistor 83, is generally similar to the collector-coupled astable multi shown at p. 439, FIGS. 11–23 of the above-cited text by Millman and Taub. The transistor 83 of FIG. 5 is essentially a variable shunt on the resistor 85 of FIG. 5, corresponding to the element $R_1$ in the cited FIGS. 11-23 of the text book. Suffice it to say that the duration of the output pulse on line 84 and the time between pulses are determined by the values of the resistors and capacitors in the multivibrator, assuming for the moment that transistor 83 is not in conduction, which is the situation during normal tracking operation. The reciprocal of the sum of these times is the pulse frequency, and hence determines motor speed.

The time between pulses can be reduced by placing transistor 83 in conduction, the degree of reduction of the time being a function of the amount of conduction through transistor 83 and hence its shunting effect on resistor 85. Maximum reduction is obtained when transistor 83 is in saturation, the time then being determined essentially by resistor 86 and capacitor 87. Hence maximum and minimum times between pulses can be predetermined by proportioning of resistors 85 and 86, and hence frequency and motor speed can be controlled between two set limits.

The signal for the base of transistor 83 is obtained by use of an averaging rectifier driven by A.C. amplifier 45 via conductor 81, the output of the averaging rectifier being referenced to multivibrator supply terminal 88. The output of the averaging rectifier 80 is offset by a fixed amount so that the signal produced during normal tracking will not cause conduction of transistor 83, but signals above the level produced during normal tracking will cause voltage to appear at the base of transistor 83, thus causing transistor 83 to conduct.

An averaging rectifier rather than a peak rectifier is needed so that the peaks seen during normal tracking will not cause conduction of transistor 83, the average level being below that needed to overcome the offset in the averaging rectifier. However, large signals, such as are found during the acquisition phase, will have an average level large enough to cause conduction of transistor 83. It thus becomes practical to have a high speed during acquisition, while still retaining the advantages of a low speed during tracking.

Reference is now made to the stepper motors. Parenthetically, it is within the scope of the invention to use any motor activated by a source, such as 68, essentially independent of the principal intelligence-signal channel. In this specification, that signal channel comprises 43, 45 and 64.

Figure 8:
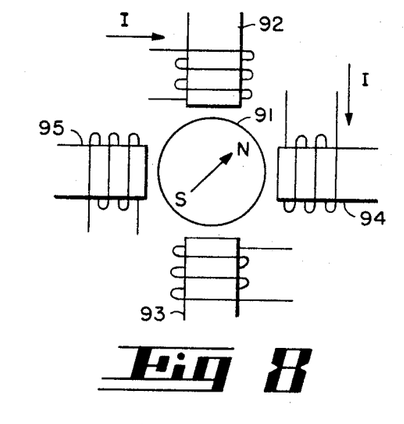
FIGS. 8, 9, 10 and 11 are skeleton outlines of four successive positions of a simplified stepper motor used in the invention.

Motors 46, 47 and 48 are similar. The motors and motor drive circuit 49 are now described more fully, reference being made first to FIGS. 8-11. Motor 48 is shown diagrammatically in FIG. 8, and consists of a permanent magnet rotor 91 having a north pole N and a south pole S, and four field coils 92, 93, 94 and 95. It will be understood, of course, that more poles can be placed on rotor 91, with more coils being added to the stationary field-coil-supporting structure in multiples of four coils for each pair of north and south poles on the rotor. As will be described below, the stepper motor here shown in principle has four illustrative positions as indicated in FIGS. 8, 9, 10 and 11. Hence, with current passing through an adjacent pair of coils 92 and 94, the rotor assumes a position as shown in FIG. 8, for example. Motor drive circuit 49 being arranged so that only adjacent coils can be energized, there are four preferential positions of the rotor as shown. As long as a pair of coils remains energized, the rotor will remain in or near the preferential position for that pair of coils unless torques above the rating of the motor are applied to the motor shaft. Since motor drive circuit 49 is so arranged that first, only one coil of pair 92-93 and only one coil of pair 94-95 may be energized at any one time, and secondly, current may be switched from one coil of a pair to the other coil of the same pair only in one of the two pairs at any one instant, there is never any uncertainty as to which direction the rotor will turn. Further, the rotor must turn through one "step" at a time, that step being 90° for the motor shown. Increased numbers of poles and coils will reduce the magnitude of the step. Stated in another way, it is not possible for the coils to be energized first as shown in FIG. 8 and next as shown in FIG. 10. If this could occur, the direction of rotation would be uncertain. With the circuit of FIG. 13, the motor will be stepped from the position of FIG. 8 to that of FIG. 9 and thence to the position of FIG. 10, and so on, if clockwise rotation is desired, or from the position of FIG. 8 to that of FIG. 11, and then to that of FIG. 10, and so on, if counterclockwise rotation is desired.

Figure 12:
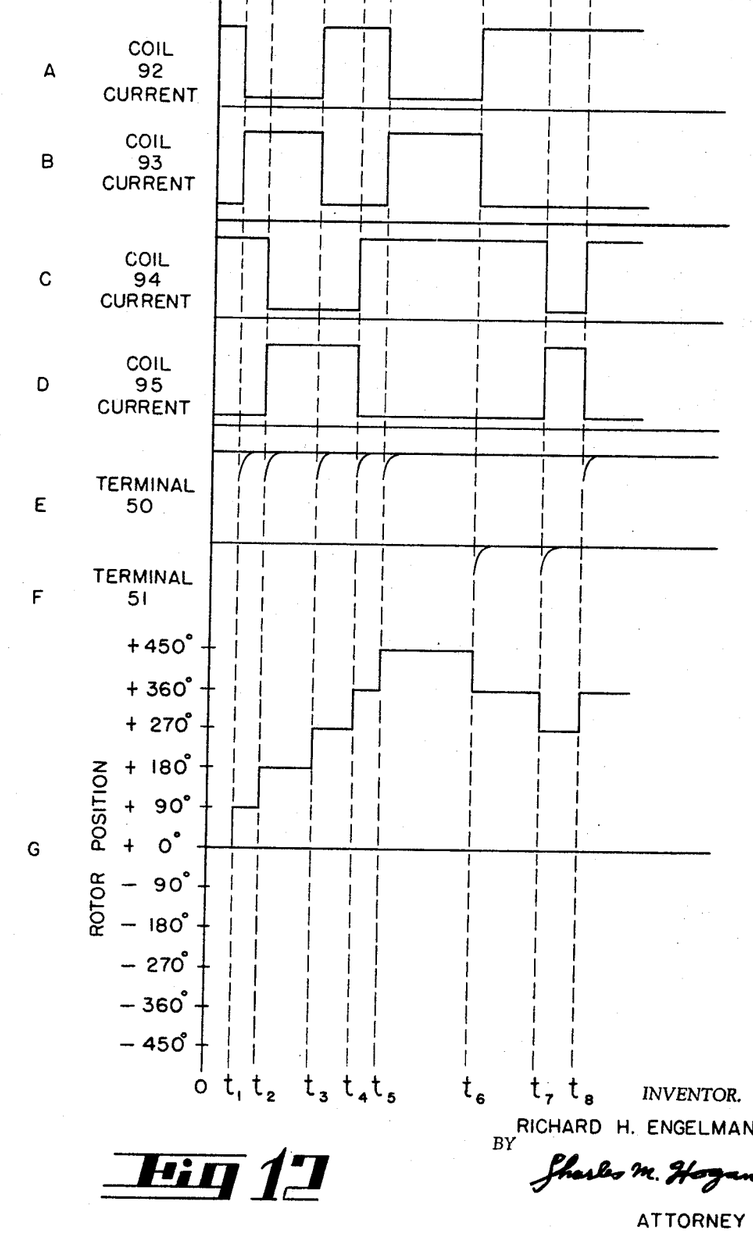
FIG. 12 is a set of curves used in describing the operation of the FIG. 13 circuitry.
Figure 15:
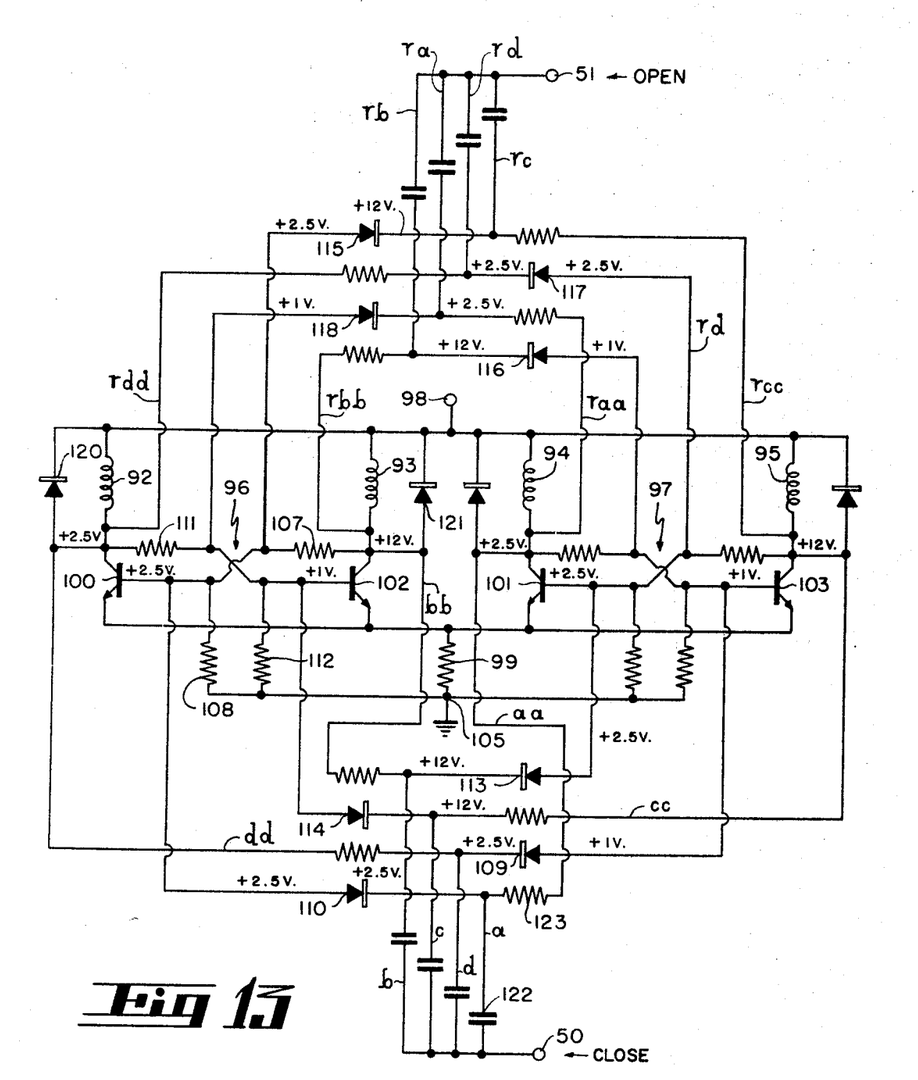

Reference is now made to FIG. 12 which shows a "synchrogram" of currents in coils 92 through 95, pulses on "clockwise" terminal 50 of motor drive circuit 49, pulses on "counterclockwise" terminal 51 of motor drive circuit 49, and resultant rotor positions, the rotor position of FIG. 8 being used arbitrarily as the 0° position. As shown in FIG. 12, for time between zero and $t_1$, there is current in coil 92 and in 94, producing the situation of FIG. 8. It will also be noted that there are currents in coils 93, 95, but these are quite small and have negligible effect. Their presence is due to the biasing circuitry of FIG. 13 and it will be assumed for convenience in subsequent discussion that these small currents do not exist.

At the time $t_1$, a pulse is placed on terminal 50 this pulse being generated by multivibrator 68 and having arrived at motor drive circuit 49 via emitter follower 52 and line 50, for example. (It will be understood that "clockwise" and "counterclockwise" from the standpoint of the tracking system depend on the position of the observer.) This pulse cuts off current in coil 92 and energizes coil 93, while leaving unchanged the current in coil 94 and the negligible current in coil 95, producing the situation depicted in FIG. 9. At time $t_2$, another pulse arrives on terminal 50 cutting off the current in coil 94 and energizing coil 95, while leaving unchanegd the current in coil 93 and the negligible current in coil 92. Thus the situation diagrammed in FIG. 10 has been achieved, with 180° of rotation in a clockwise sense from the original position. Pulses at $t_3$, $t_4$ and $t_5$ will, in a similar fashion, cause the rotor to move to the positions shown in FIGS. 11, 8 and 9, respectively.

At the time $t_6$, a pulse arrives at terminal 51 of motor drive circuit, this pulse again being generated by multivibrator 68, but being directed through emitter follower 53 and line 51. The pulse on terminal 51 produces the opposite effect of that on terminal 50. That is, a pulse arriving on terminal 50 at this point would have caused switching of current from coil 94 to coil 95, but the pulse on terminal 51 leaves unaffected the currents in coils 94 and 95, while switching the currents of coils 92 and 93. There is then a step in the counterclockwise position, rotor 91 returning to the position of FIG. 8. A second pulse on terminal 51, arriving at time $t_7$, will now leave the currents in coils 92 and 93 unaffected, while switching the currents in coil 94 and 95. Then there is current in coil 92 and coil 95, resulting in rotor position as in FIG. 11, another counterclockwise step of 90°. If at time $t_8$, a pulse arrives on "clockwise" terminal 50, current will be established in coil 94 and reduced to nearly zero in coil 95, while being maintained unchanged in coil 92. Rotor position will then advance clockwise through 90°, returning to that of FIG. 8.

It will be noted that spacing between pulses need not be uniform. There is, of course, a minimum spacing which is allowable, this minimum spacing being determined by the motor and load characteristics and the motor drive circuit characteristics. There is no finite maximum allowable spacing. Lack of pulses simply means that the rotor stays in one position, as described above.

It will now be evident that energizing comparable coils of motors 46, 47 and 48 simultaneously will result in all three motors advancing one step whenever the motor drive circuit switches the coil currents. Synchronization of the three vanes is achieved. It should also be noted that such motors may be operated continuously against stops without damage.

The motor drive circuit 49 is shown in detail in FIG. 13.

Figure 9:
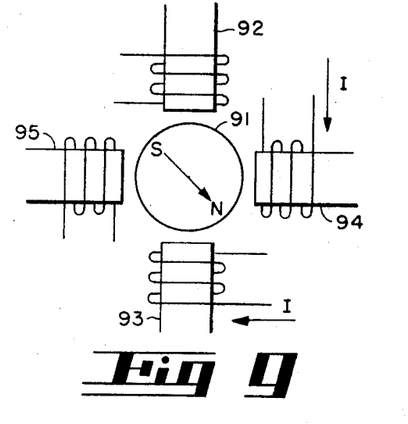
Figure 10:
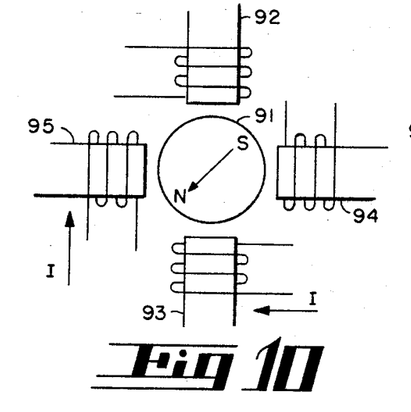
Figure 11:
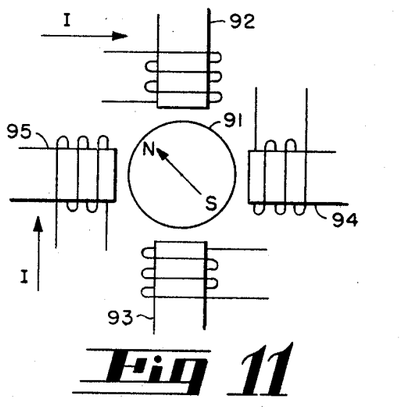

The principle of operation of the FIG. 13 circuit is illustrated by assuming that armature 91 starts from FIG. 8 position and moves through the FIG. 9–11 positions and back to the FIG. 8 position, in four steps, as pulses are applied on line 50.

The characteristics of these positions and the transitions between them are as follows:

| | |
|---|---|
| FIG. 8 | Coils 92 and 94 are active. |
| Transition 8 to 9 | Coil 92 is deenergized, 93 is activated. |
| FIG. 9 | Coils 94 and 93 are active. |
| Transition 9 to 10 | Coil 94 is deenergized, 95 is activated. |
| FIG 10 | Coils 93 and 95 are active. |
| Transition 10 to 11 | Coil 93 is deenergized, 92 is activated. |
| FIG. 11 | Coils 95 and 92 are active. |
| Transition 11 to 8 | Coil 95 is deenergized, 94 is activated. |
| FIG. 8 | Coils 92 and 94 are active. |

The FIG. 13 circuit provides a means for running the motors 46–48 in either direction. A transistorized binary or bistable circuit 96 selects between coils 92 and 93 and a transistorized binary or bistable circuit 97 selects between coils 94 and 95. The coils 92–95 are individually in series with the collectors of the four transistors in the two multivibrators 96 and 97, so that when any coil is activated it is in circuit between positive supply terminal 98, a conductive collector-emitter path, a common emitter resistor 99 and the negative supply terminal (i.e., ground). The coils 92, 93, 94 and 95 are in circuit with the collectors of transistor 100, 102, 101 and 103, respectively.

Note that each transition calls for two functions to be performed. It will be understood that each of multivibrators 96 or 97 is a bistable or flip-flop, equivalent to a single pole double throw selector switch. When multivibrator 96 activates coil 92 for example, it inherently deenergizes coil 93. Therefore, the two functions performed at each transition are performed by one of flip-flops 96, 97 at a time. For example, transition 8–9 is performed by flip-flop 96 only. Transition 9–10 is performed by flip-flop 97 only.

From the foregoing it will be seen that incoming negative pulses on line 50 can be made to deactivate coils 92, 94, 93 and 95 in succession, if so routed as to be applied successively to the bases of transistors 100, 101, 102 and 103 along paths a, b, c and d, respectively. Accordingly, paths a, b, c, and d are provided from input terminal 50 to the bases of transistor 100, 101, 102 and 103, respectively.

The collectors of non-conducting ones of transistors 100–103 provide biasing points which are used to block off those two of paths a, b, c, and d, which are not only not used at any given phase for turn-off of the desired transistor, but which, if not blocked, would interfere with the proper sequencing. Accordingly, blocking paths aa, bb, cc, and dd are provided from the collectors of transistors 101, 102, 103 and 100, respectively. The operation is such that relatively high voltage at the collectors of the non-conducting transistors causes to be blocked the two of the paths a, b, c, and d through which the negative pulse from 50 is not to be steered.

Operation of the circuit can best be illustrated by assuming certain transistors to be "on" and others to be "off" and then showing the results obtained when a negative pulse is applied to input terminal 50. In the following, voltage levels cited are intended merely to illustrate a possible situation, and are not intended to restrict the circuit to such operation. Suppose, by way of example, that terminal 98 is connected to a positive twelve volt supply, terminal 105 being the negative terminal of that supply. Suppose further that all emitters are at plus two volts by reason of current in the common emitter resistor 99. It will be noted that two transistors are always "on" and hence this voltage is constant. If transistors 100 and 101 are "on" then their collectors will be at a potential slightly above emitter potential, say at plus 2.5 volts, and their bases will be likewise at a slightly higher potential than the emitter. For convenience this will also be assumed to be plus 2.5 volts.

Since transistors 100 and 101 are "on," by the nature of flip-flop action transistors 102 and 103 will be "off." This requires that their bases be negative with respect to their emitters, but they must still be above ground. Assume their base potentials to be plus 1 volt. Since transistors 102 and 103 are cut off, their collectors will be nearly at plus 12 volts, there being a slight drop through the coil resistance because of current required in the biasing circuit of the other associated transistor. For example, transistor 100 is biased by current through coil 93 and resistors 107 and 108. Since 107 and 108 have much larger resistance than coil 93, the collector of transistor 102 is essentially at plus twelve volts. Note that, in the absence of input pulses, there is no current through any of the resistors in the pulse blocking networks, and hence the voltages on both sides of any one resistor are equal. For convenience in following the ensuing discussion, the voltage values above are shown at appropriate points in FIG. 13.

It will be noted that coils 92 and 94 have current, and hence the motor currents are as in FIG. 8. If a negative pulse of voltage (say 3 volts) is now applied to terminal 50, a negative pulse will appear on the base of transistor 103 by way of path d, the diode 109 having a reverse bias of only 1.5 volt. The negative pulse on the base of transistor 103 is in such a direction as to turn the transistor "off" but since it is already "off" the pulse has no effect. A negative pulse also reaches the base of transistor 100 via path a because the diode 110 has no bias. Transistor 100 being in conduction, this negative pulse tends to turn it off, causing its collector voltage to rise toward plus 12 volts. This, in turn, because of current flow through the voltage divider 111, 112 supplies base current to transistor 102 causing it to turn "on." The fall in the collector voltage of 102 causes a reduction in voltage at the base of transistor 100 to a value below emitter potential, holding it "off" and the insuring that it will stay off.

It will be noted that diodes 113 and 114 had large reverse voltages across their terminals, and hence the pulse from 50 will not pass through to the bases of transistors 101 and 102. Transistor 102 will have an adequate supply of base current via resistor 111. There are now currents in coils 93 and 94, yielding the situation shown in FIG. 9, 90° clockwise from the original position. If now another negative pulse is applied to terminal 50, that pulse will be steered to the bases of transistors 100 and 101. Transistor 100 being "off," the pulse will have no effect on the left-hand flip-flop 96. Application of the pulse to the base of transistor 101, however, will cause it to go into the "off" state and transistor 103 will then go into the "on" state. Current is now present in coils 93 and 95, and the rotor assumes the position shown in FIG. 10.

Parenthetically, let the discussion begin again with transistors 100 and 101 in conduction, so that currents are established in coils 92 and 94, and voltage levels are as indicated in FIG. 13. Applying a suitable negative pulse to terminal 51, we see that diodes 115 and 116 have a large back bias, while 117 and 118 have a small back bias. Thus the pulse is "steered" through diode 117 to the base of transistor 101 and through diode 118 to the base of transistor 102. Transistor 102 being "off" already, there is no change in the state of the left-hand flip-flop.

On the other hand, the negative pulse arriving at the base of transistor 101 will shut it "off," which action will turn transistor 103 "on," establishing current in coil 95. Coils 92 and 95 carrying current, the rotor turns counterclockwise to the position shown in FIG. 11, 90° counterclockwise from the original position as in FIG. 8. Further pulses on terminal 51 will cause the rotor to move in 90° steps in the counterclockwise direction.

Steps of the size used here for illustration are obviously too large. Sufficiently small steps may be obtained in practice by use of multiple poles and coils and also by use of gear trains. It must also be mentioned that several other variations of the stepper motors and the drive circuit are available, and description of one particular configuration is not intended to limit the scope of the invention only to that configuration shown.

Referring now to the details of FIG. 13, flip-flops 96 and 97 are alike. Only one is described in detail. The collector of transistor 100 is in series with coil 92 and is coupled to the base of transistor 102 by resistor 111. The collector of transistor 102 is coupled to the base of transistor 100 by resistor 107. The bases of transistors 100 and 102 are returned to ground 105 by resistors 108 and 112, respectively. Both emitters are connected to the ungrounded terminal of emitter resistor 99. Coils 93 and 92 are in series between positive supply terminal 98 and the collectors of transistors 102 and 100, respectively. Coils 92 and 93 are paralleled by diodes 120 and 121 to suppress transients when either transistor 100 or 102 goes off.

As to the steering paths *a, b, c, d* and the blocking circuits *aa, bb, cc,* and *dd*, steering path *a* and blocking circuit *aa* are representative. Steering path *a* comprises terminal 50, capacitor 122, diode 110 and a connection to the base of transistor 100. The elements of the path are so poled and arranged that it passes a negative pulse to turn off transistor 100, unless the path *a* is blocked. Blocking circuit *aa* is a simple resistive connection 123 between the junction of elements 110 and 122 and the collector of transistor 101. When transistor 101 is not conducting, its collector voltage is high and the voltage on the cathode of 110 is high, blocking path *a*. The function of path *a* is to route a pulse from 50, to turn off 100, provided that path *a* is not blocked by circuit *aa*.

Paths *b, c* and *d* comprise elements similar to those of path *a*, connected between terminal 50 and the bases of 101, 102 and 103, respectively. Paths *bb, cc* and *dd* comprise elements similar to those of path *aa*, connected respectively between: diode 113 and the collector of 102, diode 114 and the collector of 103, and diode 109 and the collector of 100.

The functions of paths *b, c* and *d* are to route pulses from 50 to turn off 101, 102, 103, respectively. The functions of blocking circuits *bb, cc* and *dd* are to block, respectively:

Path *b*, when 102 is not conducting,
Path *c*, when 103 is not conducting,
Path *d*, when 100 is not conducting.

The steering and blocking circuits for clockwise motor operation have no been described in detail.

For counterclockwise operation, there are provided:

Path *ra*, from terminal 51 to the base of 102;
Path *rb*, from terminal 51 to the base of 103;
Path *rc*, from terminal 51 to the base of 100;
Path *rd*, from terminal 51 to the base of 101.

If pulses successively go down paths *rd, rc, rb* and *ra* for a counterclockwise revolution, transistors 101, 100, 103 and 102 are extinguished in succession and coils 94, 92, 95 and 93 are deactivated in succession. This satisfies the criterion of FIG. 8.

Each of the paths *ra–rd* contains the same type of elements as the paths *a–d*.

The functions of paths *ra, rb, rc* and *rd* are, then respectively, unblocked, to pass pulses from terminal 51 which cut off these transistors, respectively: 102, 103, 100, 101. Paths *rd, rb* and *rc* comprise elements similar to those of *ra*, which path *ra* comprises a capacitor and diode 118 in series between terminal 51 and the base of transistor 102. Paths *rb, rc* and *rd* are between 51 and the bases of transistors 103, 100 and 101, respectively.

The functions of blocking circuits *raa, rbb, rcc* and *rdd* are to block, respectively, path *ra* when transistor 101 is not conducting, path *rb* when transistor 102 is not conducting, path *rc* when transistor 103 is not conducting, path *rd* when transistor 100 is not conducting. Blocking circuit *raa* is representative and it comprises a resistive connection between the collector of transistor 101 and diode 118. The other three blocking circuits in the counterclockwise steering arrangement have similar elements.

While there has been shown and described what is considered to be the preferred embodiment of the invention, it will be understood by those skilled in the art that various changes and modifications may be made therein without departing from the scope of the invention as defined in the appended claims.

For example, the invention is not restricted to a step motor and in its broad aspects the invention embraces any vane control system in which the signal developed by the sensor or the like is used to control the direction and flow of energy from an independent source, such as multivibrator 68, to the motor drive for the vanes.

The invention, viewed in one aspect, comprises:

In a headlighting system for installation in a vehicle of the type which includes a direction finder 20 etc., FIG. 4, having a bearing-measuring element 23 and at least one light beam projecting headlamp having a shadow-casting element 28, the bearing-measuring element 23 and the shadow-casting element being synchronized in azimuth in accordance with the relative bearing of an opposing vehicle (40, FIGS. 1 and 2) headlamp, the improvement which comprises the combination of:

a bidirectional electrical drive 46–49 (FIG. 6) including motor means 46–48 for positioning said bearing-measuring and shadow-casting elements, said drive having a first input 50 to which energy is applied to drive the bearing-measuring and shadow-casting elements in one direction and a second input 51 to which energy is applied to drive the bearing-measuring and shadow-casting elements in the opposite direction, a source of energy 68, a first means 52 for routing energy from said source to the first input and a second means 53 for routing energy from said source to the second input, sensing means 43, 45 for producing electrical signals indicative of the presence of said headlamp on the opposing vehicle, a binary element 54 (FIG. 6 and FIG. 7) responsive to the action of the sensing means for selecting one or the other of said routing means in accordance with the magnitude of said electric signals, the binary element being characterized by a first state, in which it selects the first routing means 52 to cause the bearing-measuring and shadow-casting elements to be driven angularly in a shadow-casting direction, and by a second state in which it selects the second routing means 53 to cause the bearing-measuring and shadow-casting elements to be driven in the opposite direction, the sensing means having a signal channel 43, 45, a light chopper drive 70 outside of that channel, a first rectifier 64 between the sensing means and the binary element for applying said electrical signals to the binary element with one polarity when the sensing means is in normal operation, and a second rectifier 63 between the chopper drive and the binary element for applying to the binary element a voltage of the opposite polarity when the light chopper 44 is in operation, whereby the binary element remains in the first state unless said voltage on 59 is sufficient in magnitude to exceed the threshold of the binary element and to cause the binary element to change state, and whereby said electrical signals on 60 tend to bias the binary element into the first state.

Having fully disclosed the invention I claim:

1. In a headlighting system for installation in a vehicle of the type which includes a light-beam projector and a shadow-casting element which is positioned in a manner dependent on the presence or absence of an opposing vehicle headlamp, the improvement which comprises the combination of:
   a bidirectional electrical drive including motor means for positioning said shadow-casting element, said drive having a first input to which energy is applied to drive the shadow-casting element in one direction and a second input to which energy is applied to drive the shadow-casting element in the opposite direction,
   a source of energy,
   a first means for routing energy from said source to the first input,
   a second means for routing energy from said source to the second input,
   sensing means for producing electrical signals indicative of the presence of said headlamp, and
   decision means responsive to the action of the sensing means for selecting one or the other of said routing means in accordance with a characteristic of said electric signals.

2. The combination in accordance with claim 1 in which the decision means is a binary element.

3. The combination in accordance with claim 1 in which the source of energy is a pulse generating device.

4. The combination in accordance with claim 1 in which the motor means is a stepper motor.

5. The combination in accordance with claim 4 in which the source of energy is a pulse generating device having a time cycle controllable by a potential, and averaging rectifier means coupled between the sensing means and the pulse generating device for providing that potential.

6. In a headlighting system for installation in a vehicle of the type which includes a light-beam projector and a shadow-casting element which is positioned in a manner dependent on the presence or absence of an opposing vehicle headlamp, the improvement which comprises the combination of:
   a bidirectional electrical drive including motor means for positioning said shadow-casting element, said drive having a first input to which energy is applied to drive the shadow-casting element in one direction and a second input to which energy is applied to drive the shadow-casting element in the opposite direction,
   a source of energy,
   a first means for routing energy from said source to the first input,
   a second means for routing energy from said source to the second input,
   a sensing means for producing electrical signals indicative of the presence of said headlamp,
   a binary element responsive to the action of the sensing means for selecting one or the other of said routing means in accordance with the magnitude of said electrical signals,
   the binary element being characterized by a first state, in which it selects the first routing means to cause the shadow-casting element to be driven angularly in a shadow-casting direction, and by a second state in which it selects the second routing means to cause the shadow-casting element to be driven in the opposition direction,
   the sensing means having a signal channel,
   a light chopper drive outside of that channel,
   a first rectifier between the sensing means and the binary element for applying said electrical signals to the binary element with one polarity when the sensing means is in normal operation,
   a second rectifier between the chopper drive and the binary element for applying to the binary element a voltage of the opposite polarity when the light chopper is in operation,
   whereby the binary element remains in the first state unless said voltage is sufficient in magnitude to exceed the threshold of the binary element and to cause the binary element to change state, and whereby said electrical signals tend to bias the binary element into the first state.

7. The combination in accordance with claim 6 and including an override comprising means for sampling the voltage output of the first rectifier and means for utilizing the sample to change the state of the binary element.

8. The combination in accordance with claim 7 in which the means for sampling the voltage output of the first rectifier comprises an energy storage device which measures the magnitude of the output of the sensing means to provide a sample and in which the means for utilizing that sample comprises a switch which applies the sample to the binary element in such manner that when the sample is large the binary element is caused to assume its second state and when the sample is small the binary element is caused to assume its first state.

9. The combination in accordance with claim 8 in which the first rectifier has a negative output of said one polarity for applying electrical signals to the binary element and an output of the same polarity as the second rectifier coupled to the sampling means, and in which the sampling means comprises a capacitor, the utilizing means comprising a single pole double-throw switch.

10. In a headlighting system for installation in a vehicle of the type which includes a direction finder having a bearing-measuring element and at least one light-beam projecting headlamp having a shadow-casting element, the bearing-measuring and shadow-casting elements being synchronously positioned in accordance with the relative bearing of an opposing vehicle headlamp, and a sensing means for producing electrical signals indicative of the presence of said opposing vehicle headlamp, the improvement which comprises the combination of:
   a bidirectional electrical drive including motor means for positioning said bearing-measuring and shadow-casting elements, said drive having a first input to which energy is applied to drive the shadow-casting and bearing-measuring elements in one direction and a second input to which energy is applied to drive the shadow-casting and bearing-measuring elements in the opposite direction,
   a source of energy,
   a first means for routing energy from said source to the first input,
   a second means for routing energy from said source to the second input, and
   decision means responsive to the action of the sensing means for selecting one or the other of said routing means in accordance with a characteristic of said electric signals.

11. The combination in accordance with claim 10 in which the decision means is a binary element.

12. The combination in accordance with claim 10 in which the source of energy is a pulse generating device.

13. The combination in accordance with claim 10 in which the motor means is a plurality of stepper motors.

14. The combination in accordance with claim 13 in which the source of energy is a pulse generating device having a time cycle controllable by a potential, and averaging rectifier means coupled between the sensing means and the pulse generating device for providing that potential.

15. In a headlighting system for installation in a vehicle of the type which includes a direction finder having a bearing-measuring element and at least one light-beam projecting headlight having a shadow-casting element, the bearing-measuring element and the shadow-casting element being synchronized in accordance with the relative bearing of an opposing vehicle headlamp, the improvement which comprises the combination of:

a bidirectional electrical drive including motor means for positioning said bearing-measuring and shadow-casting elements, said drive having a first input to which energy is applied to drive the bearing-measuring and shadow-casting elements in one direction and a second input to which energy is applied to drive the bearing-measuring and shadow-casting elements in the opposite direction, a source of energy, a first means for routing energy from said source to the first input, a second means for routing energy from said source to the second input, sensing means for producing electrical signals indicative of the presence of said opposing-vehicle headlamp, a binary element responsive to the action of the sensing means for selecting one or the other of said routing means in accordance with the magnitude of said electrical signals, the binary element being characterized by a first state, in which it selects the first routing means to cause the bearing-measuring and shadow-casting elements to be driven angularly in a shadow-casting direction, and by a second state in which it selects the second routing means to cause the bearing-measuring and shadow-casting elements to be driven in the opposite direction, the sensing means having a signal channel, a light chopper drive outside of that channel, a first rectifier between the sensing means and the binary element for applying said electrical signals to the binary element with one polarity when the sensing means is in normal operation, and a second rectifier between the chopper drive and the binary element for applying to the binary element a voltage of the opposite polarity when the light chopper is in operation, whereby the binary element remains in the first state unless said voltage is sufficient in magnitude to exceed the threshold of the binary element and to cause the binary element to change state, and whereby said electrical signals tend to bias the binary element into the first state.

16. The combination in accordance with claim 15 and including an override comprising means for sampling the voltage output of the first rectifier and means for utilizing the sample to change the state of the binary element.

17. The combination in accordance with claim 16 in which the means for sampling the voltage output of the first rectifier comprises an energy storage device which measures the magnitude of the output of the sensing means to provide a sample and in which the means for utilizing that sample comprises a switch which applies the sample to the binary element in such manner that when the sample is large the binary element is caused to assume its second state and when the sample is small the binary element is caused to assume its first state.

18. The combination in accordance with claim 17 in which the first rectifier has a negative output of said one polarity for applying electrical signals to the binary element and an output of the same polarity as the second rectifier coupled to the sampling means, and in which the sampling means comprises a capacitor, the utilizing means comprising a single pole double-throw switch.

19. In a vehicle lighting system of the type including a light-beam projecting headlamp having a shadow-casting element which is positioned in a manner dependent on the presence or absence of an opposing vehicle headlamp, the improvement which comprises:

a source of energy independent of the opposing vehicle headlamp, bidirectional drive means for positioning the shadow-casting element, and means including a selector device for coupling the source of energy to the bidirectional means in such a way that the bidirectional means drives the shadow-casting element in one direction or the other.

20. The combination in accordance with claim 19 in which the bidirectional drive means comprises a stepper motor.

21. The combination in accordance with claim 20 in which the source of energy is a pulse source and in which the bidirectional drive means further includes a bidirectional sequencer which is responsive to pulses from said source to activate the motor step by step.

22. In a headlighting system for installation in a vehicle of the type which includes a light-beam projector and a shadow-casting element which is positioned in a manner dependent on the presence or absence of an opposing vehicle headlamp, the improvement which comprises the combination of:

a bidirectional electrical drive including motor means for positioning said shadow-casting element, said drive having a first input to which energy is applied to drive the shadow-casting element in one direction and a second input to which energy is applied to drive the shadow-casting element in the opposite direction, a source of energy, a first means for routing energy from said source to the first input, a second means for routing energy from said source to the second input, sensing means for producing electrical signals indicative of the presence of said headlamp, decision means responsive to the action of the sensing means for selecting one or the other of said routing means in accordance with a characteristic of said electric signals, and means coupled to the sensing means for determining the rate of flow of the routed energy.

References Cited

UNITED STATES PATENTS

| | | | |
|---|---|---|---|
| 2,753,487 | 7/1956 | Bone | 315—82 |
| 2,941,118 | 6/1960 | Engelmann | 315—82 |
| 3,132,252 | 5/1964 | Englemann | 315—82 X |

JAMES W. LAWRENCE, *Primary Examiner.*

C. R. CAMPBELL, *Assistant Examiner.*